United States Patent [19]

Ishigami et al.

[11] Patent Number: 4,517,945

[45] Date of Patent: May 21, 1985

[54] ENGINE VIBRATION TRANSMISSION STRUCTURE

[75] Inventors: Kazuhiro Ishigami, Yokohama; Shoji Furuhashi, Isezaki; Haruo Yuzawa, Yokohama, all of Japan

[73] Assignee: Nissan Motor Co., Ltd., Yokohama, Japan

[21] Appl. No.: 452,731

[22] Filed: Dec. 23, 1982

[30] Foreign Application Priority Data

Jan. 26, 1982 [JP] Japan ............................ 57-9215[U]

[51] Int. Cl.³ .............................................. F02P 5/14
[52] U.S. Cl. .................................... 123/425; 123/435; 73/35
[58] Field of Search ...................... 123/425, 435, 494; 73/35

[56] References Cited

U.S. PATENT DOCUMENTS 2,275,675  3/1942  Draper et al. ........................... 73/35

FOREIGN PATENT DOCUMENTS 0079042  5/1983  European Pat. Off. ............ 123/425
2716712  10/1978  Fed. Rep. of Germany ........... 73/35
0179371  11/1982  Japan ................................. 123/425
2110302  6/1983  United Kingdom ................. 123/425

Primary Examiner—Parshotam S. Lall
Attorney, Agent, or Firm—Schwartz, Jeffery, Schwaab, Mack, Blumenthal & Koch

[57] ABSTRACT

A structure for use in an internal combustion engine including a cooling passage between an engine block outer wall and cylinder walls each defining therein a cylinder. The engine block outer wall has a thickened portion with connection arms extending to the respective cylinder walls to provide a rigid connection between the cylinder wall and the position at which a knock sensor is attached. The rigid connection is effective to transmit vibrations due to internal combustion in the cylinders to the knock sensor with minimized attenuation and minimized distortion.

10 Claims, 6 Drawing Figures

← FRONT

ENGINE VIBRATION TRANSMISSION STRUCTURE

BACKGROUND OF THE INVENTION

This invention relates to a structure for use in an internal combustion engine for transmitting, with minimized attenuation, vibrations due to internal combustion in engine cylinders to a knock sensor attached to the engine at an exterior location.

It is the common practice to improve fuel economy in an internal combustion engine by advancing the spark of the engine as close as possible to a value above which knocking occurs and by retarding the spark immediately when knocking occurs. For this purpose, spark control circuits have been proposed which can advance and retard the spark of an engine in response to the frequency of occurrence of engine knock. Such a spark control circuit includes a knock sensor attached to an engine at an exterior location where vibratory forces within the engine are translated into voltage signals at the knock sensor output. The spark control circuit also includes a pulse generator connected to the knock sensor for generating pulses to a counter while the knock sensor output is greater than the signal of background vibration produced by normal engine operation without knocking. The count of the counter corresponds to the frequency of occurrence of engine knock.

Accordingly, the need has been recognized for a new and improved structure capable of transmitting vibrations due to internal combustion in engine cylinders to the knock sensor with minimized attenuation and minimized distortion.

SUMMARY OF THE INVENTION

The present invention provides a structure for use in an internal combustion engine including an engine block having a cooling passage therethrough between an engine block outer wall and cylinder walls each defining a cylinder. The engine block outer wall has a transducer attached at a position on its outer surface. The transducer is operable to sense vibratory forces due to internal combustion in the cylinders. The engine block outer wall has a thickened portion with connection arms extending to the respective cylinder walls to provide a rigid connection between the cylinder wall and the position at which the transducer is attached on the outer surface of the engine block outer wall.

Preferably, the thickened portion has a thickness more that of double than the engine block outer wall and a transverse sectional area substantially equal to that of the connection arms.

BRIEF DESCRIPTION OF THE DRAWINGS

These details as well as other features and advantages of this invention are set forth below and are shown in the accompanying drawings, in which.

DETAILED DESCRIPTION OF THE INVENTION

Figure 1:
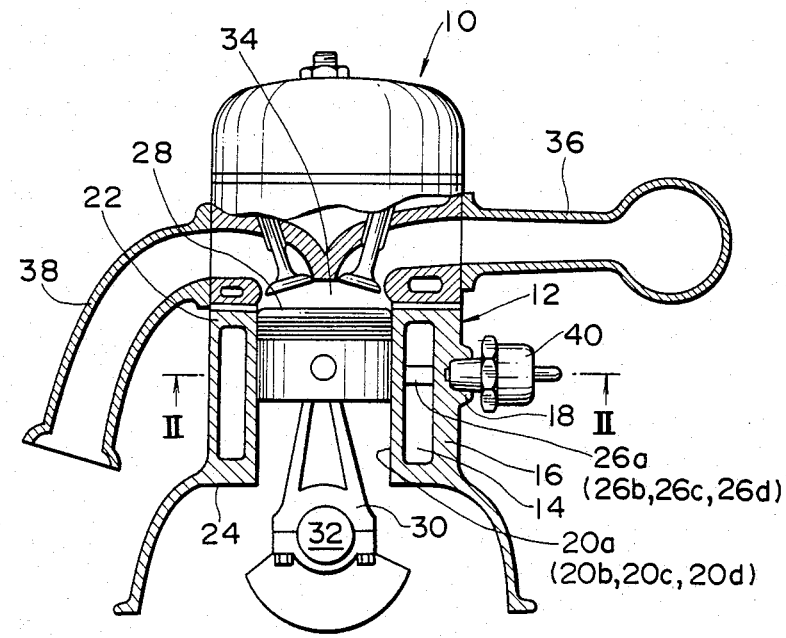
FIG. 1 is a fragmentary vertical sectional view of a portion of a four-cylinder internal combustion engine on which the present invention is an improvement.
Figure 2:
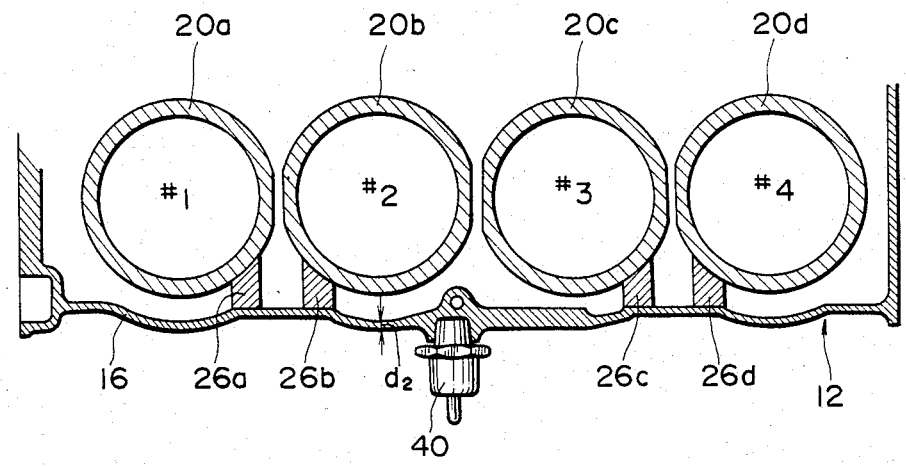
FIG. 2 is a fragmentary horizontal sectional view taken along the lines II—II of FIG. 1.

FIGS. 1 and 2 illustrate an engine vibration transmission structure which is disclosed in Japanese Patent Application No. 56-186496 filed on Nov. 20, 1981 and on which the present invention is an improvement. Prior to the description of the preferred embodiment of the present invention, we shall briefly describe the vibration transmission structure in FIGS. 1 and 2 in order to specifically point out the difficulties attendant thereon.

Referring to FIGS. 1 and 2, in particularly, an internal combustion engine 10 is shown having four cylinders #1, #2, #3 and #4 in an in-line relationship. The engine 10 includes an engine block 12 having a cooling passage 14 therethrough, in which an engine coolant is circulated in a conventional manner. The cooling passage 14 is defined by an engine block outer wall 16, four cylinder walls 20a, 20b, 20c and 20d in which the cylinders #1 to #4 are respectively formed, an upper deck 22, and a lower deck 24. Substantially intermediate the front and rear ends of the engine block 12, the engine block outer wall 16 has on its one outer surface a boss 18 for attachment of a transducer (knock sensor) 40. The boss 18 is formed with an internally threaded recess and the transducer 40 has a threaded extension which is threadably engaged with the internally threaded recess of the boss 18. The cylinder walls 20a, 20b, 20c and 20d are connected to the engine block outer wall 16 by respective connection ribs 26a, 26b, 26c and 26d which extend through the cooling passage 14 substantially midway between the upper and lower decks 22 and 24 and reinforce the engine block 12. A piston 28 is fitted in each of the cylinders #1 to #4 and is coupled through a connecting rod 30 to a crankshaft 32. A combustion chamber 34 is defined in each of the cylinders #1 to #4 between the end wall thereof and the opposed end surface as formed on the piston 28. The combustion chamber 34 is supplied with a combustible gas, particularly a fuel-air mixture, through an intake passage 36 and the exhaust gases are suitably discharged through an exhaust passage 38.

The vibratory forces within the cylinders #1 to #4 due to internal combustion travel from the cylinder walls 20a, 20b, 20c and 20d through the respective ribs 26a, 26b, 26c and 26d to the engine block outer wall 16, and hence through the engine block outer wall 16 to the transducer 40. The transducer 40 senses the transmitted vibratory forces and translates them into a voltage signal P proportional to the intensity of the sensed vibratory forces.

Figure 3:
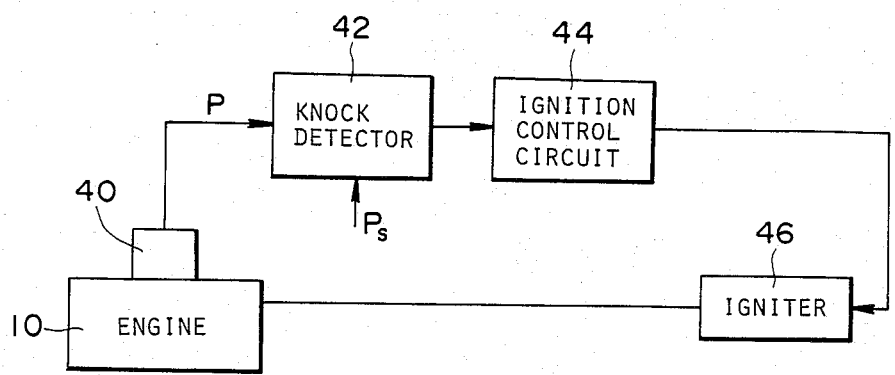
FIG. 3 is a schematic block diagram showing a spark timing control circuit which includes a transducer attached to an engine for sensing vibratory forces in the cylinders due to internal combustion.

Referring to FIG. 3, the transducer output P is coupled to a knock detector 42 which generates a signal indicative of the frequency of occurrence of the engine knock. The knock detector 42 stores a reference signal Ps indicative of background vibration produced by normal engine operation without knocking and determines that the engine is knocking when the transducer output P is greater than the reference signal Ps. The background vibration signal is obtained by averaging the transducer outputs produced during normal engine operation without engine knocking. The knock detector 42 may be of the type which counts pulses produced at a predetermined intervals while the transducer output P is greater than the reference signal Ps. The knock frequency indication signal is fed to an ignition timing control circuit 44 which thereby controls an igniter 46 so as to advance the spark of the engine as close as possible to a value above which knocking occurs and to retard the spark immediately when knocking occurs for the purpose of achieving improved fuel economy.

With the structure described in connection with FIGS. 1 and 2, although the vibratory forces within the cylinders #1 to #4 due to internal combustion can travel, with substantially no attenuation, from the cylinder walls 20a, 20b, 20c and 20d through the respective ribs 26a, 26b, 26c and 26d to the engine block outer wall 16, they are attenuated greatly while conducting through the engine block outer wall 16 to the transducer 40 with the result that small knock in the cylinders can hardly be sensed. These difficulties stem mainly from the current designs of the engine block. That is, in conventional engine blocks, the engine block outer wall is too thin to transmit the vibratory forces to the transducer without great attenuation.

Figure 4:
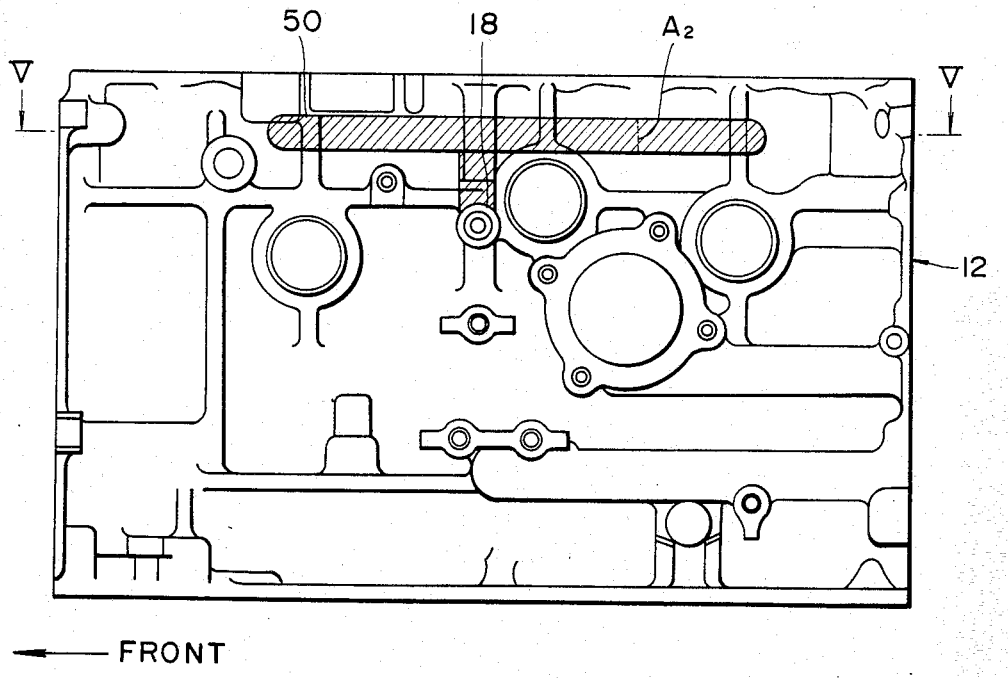
FIG. 4 is a view showing one embodiment of an engine vibration transmission structure made in accordance with the present invention.
Figure 5:
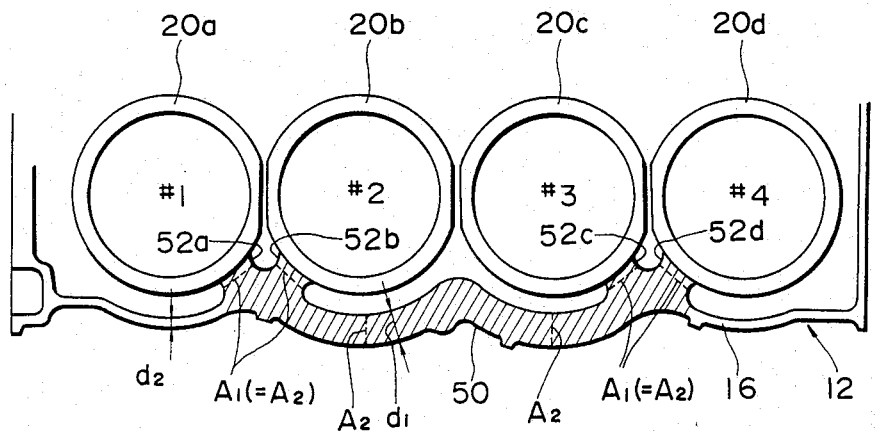
FIG. 5 is a fragmentary horizontal sectional view taken along the lines V—V of FIG. 4.

Referring now to FIGS. 4 and 5, there is illustrated one embodiment of an engine vibration transmission structure made in accordance with the present invention. The structure of FIGS. 4 and 5 is applicable to an engine substantially similar to that illustrated in FIGS. 1 and 2 except for the engine block design and is shown with a number of the components previously described. Accordingly, like reference numerals have been applied to FIGS. 4 and 5 with respect to the equivalent components shown in FIGS. 1 and 2.

In this embodiment, the engine block cylinder wall 16 has a thickened portion 50 which protrudes inwardly from its inner surface and has four connection arms 52a, 52b, 52c and 52d extending to the respective cylinder walls 20a, 20b, 20c and 20d to provide a rigid connection between the cylinder walls and the boss 18 on which the transducer 40 is attached. This structure is effective to provide vibration channels from the cylinder walls to the transducer 40. While FIGS. 4 and 5 illustrate a four-cylinder internal combustion engine, it will be appreciated that the present invention is equally applicable to other conventional engines.

The thickened portion 50 may be formed to extend linearly substantially the entire lengths of upper and lower decks 22 and 24 to connect the outermost connection arms 52a and 52d. If the boss 18 lies out of the line between the connection arms 52a and 52d, the thickened portion 50 may have a branch extending from a point which is substantially intermediate its ends to the point on which the boss 18 is formed, as shown in FIGS. 4 and 5. The connection arms 52a, 52b, 52c and 52d may be circular or polygonal in cross-sectional shape.

Preferably, the location of each of the connection arms 52a, 52b, 52c and 52d is such that the length of the vibration channel from the associated cylinder wall to the transducer 40 is substantially equal to that of another vibration channel. For four cylinder engines, the connection arms 52a and 52d associated with the outer cylinders #1 and #4 and the respective adjacent connection arms 52b and 52c associated with the inner cylinders #2 and #3 are located as close to each other as possible, as best shown in FIG. 5. It is to be understood that for two cylinder engines, the connection arm associated with one cylinder and the connection arm associated with the other cylinder may be located symmetrically with respect to the transducer 40. With this arrangement, the sensitivity of the transducer 40 to engine knock is maintained substantially the same for each of the cylinders regardless of the position of the cylinder with respect to the transducer 40. This eliminates the requirement of changing, for each of the cylinders, the reference level with which the output of the transducer is compared and permits the use of the transducer with a simplified ignition timing control circuit.

As shown in FIGS. 4 and 5, the transverse sectional area $A_1$ of the connection arms 52a, 52b, 52c and 52d is substantially equal to the transverse sectional area $A_2$ of the thickened portion 50. This is effective to transmit the vibration waves from the cylinder walls to the transducer 40 without error or distortion. The thickness $d_1$ of the thickened portion 50 is more than double the thickness $d_2$ of the engine block outer wall 16, the thickness $d_2$ being equal to the thickness of the engine block outer wall of current spark-ignition type internal combustion engine.

Through the thickened portion 50 which rigidly connects the cylinder walls 20a, 20b, 20c and 20d with the boss 18, the vibratory forces within the cylinders #1 to #4 due to internal combustion are transmitted to the transducer 40 with minimized attenuation. The transducer 40 senses the transmitted vibratory forces and converts them into a voltage signal proportional to the intensity of the sensed vibratory forces. The transducer output is applied to the knock detector 42 (FIG. 3). The knock detector 42 compares the transducer output with a background vibration signal and produces a signal indicative of the frequency of occurrence of the engine knock to the ignition timing control circuit 44 which thereby controls the igniter 46 so that the spark of the engine can be advanced to a value above which knocking occurs and retarded immediately when knocking occurs. Since the structure of the present invention can effectively and accurately transmit vibrations due to internal combustion to the transducer 40, highly accurate spark control and thus high fuel economy are expected.

Figure 6:
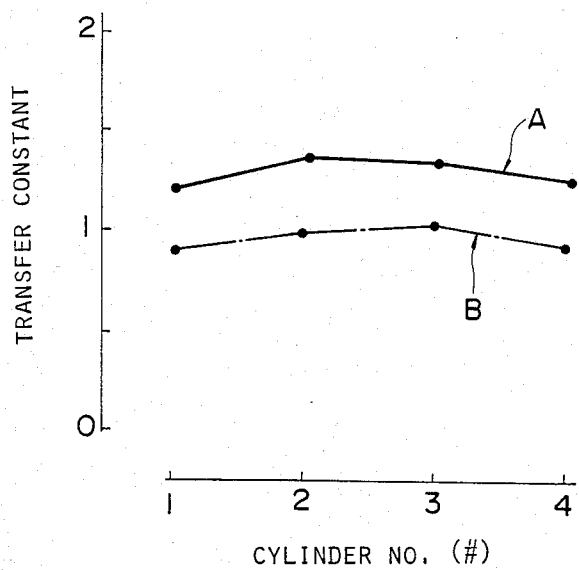
FIG. 6 is a comparative graph of transfer constant curves between the engine of FIG. 2 and the engine of FIGS. 4 and 5.

The dramatic effect the structure of the present invention has on the transfer constant obtained for each of the cylinders #1 to #4 is illustrated in FIG. 6, wherein each of the plotted transfer constant values has been measured by calculating a ratio between the output of the transducer 40 and the output of a microphone positioned near the cylinder walls 20a, 20b, 20c and 20d while generating, in each cylinder, engine knock the intensity of which is such that the microphone produces a constant output.

Curve A illustrates measured values of the transfer constant for the cylinders #1 to #4 of an engine having the structure of the present invention. It can be seen from the curve that for all of the cylinders, the measured transfer constant values are high and substantially at the same level. In contrast, curve B shows measured values of the transfer constant for the cylinders #1 to #4 of an engine as illustrated in FIGS. 1 and 2. It is quite evident that the measured transfer constant values are rather lower for all of the cylinders than those obtained for the engine of the present invention.

There has been provided, in accordance with the present invention, an engine vibration transmission structure for use in an internal combustion engine associated with a spark control circuit having a knock sensor. The engine includes a cooling passage between an engine block outer wall and cylinder walls each defining a cylinder. The engine block outer wall has a thickened portion with connection arms extending to the respective cylinder walls to provide a rigid connection between the cylinder walls and the position at which the knock sensor is attached on the outer surface of the engine block outer wall. The rigid connection is effective to transmit vibrations due to internal combustion in the cylinders to the knock sensor with minimized attenuation and minimized distortion, permitting the knock sensor to sense engine knocking certainly even if the engine knocking is faint. As a result, high engine spark control accuracy and high fuel economy can be attained.

While the present invention has been described in conjunction with a specific embodiment thereof, it is evident that many alternatives, modifications and variations will be apparent to those skilled in the art. Accordingly, it is intended to embrace all alternatives, modifications and variations that fall within the spirit and broad scope of the appended claims.

What is claimed is:

1. A structure for use in an internal combustion engine, said engine including an engine block having an engine block outer wall and a plurality of cylinder walls each defining therein a cylinder, a cooling passage defined by said engine block outer wall and said cylinder walls, and a transducer attached to an outer surface of said engine block wall for sensing vibratory forces due to internal combustion in each cylinder, said structure comprising a thickened portion of said engine block outer wall with connection arms extending to said respective cylinder walls to provide a rigid connection between said cylinder walls and a position at which said transducer is attached on said outer surface of said engine block outer wall.

2. The structure of claim 1, wherein said thickened portion has a thickness more that of double than said engine block outer wall.

3. The structure of claim 2, wherein said connection arms have a transverse sectional area substantially equal to that of said thickened portion.

4. The structure of claim 1, wherein said connection arms have a transverse sectional area substantially equal to that of said thickened portion.

5. The structure of claim 1, wherein said thickened portion extends linearly to connect the outermost connection arms.

6. The structure of claim 4, wherein said thickened portion has a thickness more that of double than said engine block outer wall.

7. The structure of claim 4, wherein said thickened portion has a thickness more that of double than said engine block outer wall and a transverse sectional area substantially equal to that of said connection arms.

8. The structure of claim 4, wherein said thickened portion has a branch extending to said position at which said transducer is attached on said engine block outer wall.

9. The structure of claim 5, wherein said thickened portion has a thickness more that of double than said engine block outer wall.

10. The structure of claim 5, wherein said thickened portion has a thickness more that of double than said engine block outer wall and a transverse sectional area substantially equal to that of said connection arms.

* * * * *